F. D. NEWBURY.
Breech-Loading Fire-Arm.
No. 152. A. I. Patented Sept. 16, 1856.
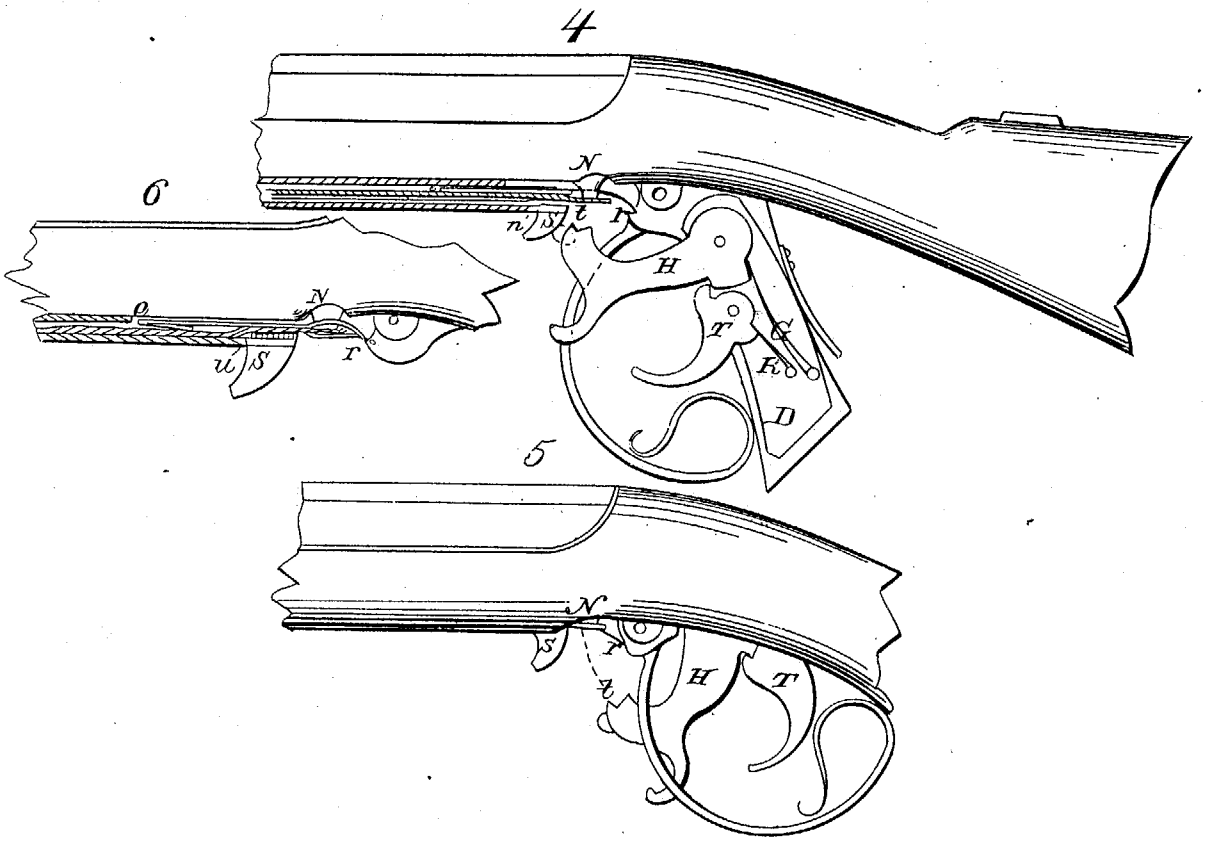
Witnesses
W. Ennis
M. Emilen
Signed
F. D. Newbury
N. PETERS, PHOTO-LITHOGRAPHER, WASHINGTON, D. C.

UNITED STATES PATENT OFFICE.

FREDERICK D. NEWBURY, OF ALBANY, NEW YORK, ASSIGNOR TO RICHARD VARICK DE WITT, OF SAME PLACE.

IMPROVED FIRE-ARM.

Specification forming part of Letters Patent No. 15,521, dated August 12, 1856; Additional Improvement No. 152, dated September 16, 1856.

*To all whom it may concern:*

Be it known that I, FREDERICK D. NEWBURY, of the city of Albany, State of New York, have invented certain Improvements upon the Method of Constructing Breech-Loading Fire-Arms for which Letters Patent of the United States were issued to me on the 12th day of August, 1856; and I declare the following specification, with the drawings hereto appended as part of the same, to be a full and perfect description thereof.

Figure 4 represents a profile of the gun shown in the drawings of the patent specification, especially of number 2, the barrel and breech not being shown in section, but the arm or block D is so shown. The block D is hollowed out box-like, so as to contain within it the base of the hammer H and of the trigger T, with their mainspring G′ and sear-spring R. They are placed in a reversed position, the hammer striking upward under the barrel. The locking and releasing operation of the one upon the other is plainly shown in the drawings. The cone N is placed under the barrel, the hammer striking it as shown by the dotted lines in Fig. 5. Just in front of the cone is a short stud, S, projecting from the barrel downward, with a forward curve and slope, so adjusted that when the arm D is thrown down to prepare for loading the extreme point of the hammer, pressing against it, shall by its inclination be thrown downward—that is, back on its own axis—and thereby locked with the trigger, as shown in Fig. 4, so that after the insertion of the charge and the bringing back of the arm D to its position within the stock, the piece is ready cocked for firing. The position of the lock being changed from above to below the stock, of necessity the position of the priming is changed, too, and the operation of priming by the arm D is thus arranged. The priming and tube, instead of being inserted into the butt of the stock, are inserted into a chamber or groove, P P, formed under the barrel in the stock in front of the stud S. The end of the tape priming passes through a slot in S onto the cone, and is held by the small spring *u* at or on the edge of the slot to prevent its retraction. It is moved backward over the cone at each loading by a little spring, *e*, which is attached to the front end or knuckle of the arm D at *r*, and it has its end which lies against the tape bent backward and downward, so as to act ratchetwise, and with every movement of the arm D advance the tape to cover the cone. The cutter for the tape is at the front end of the hammer at *t*, and so prevents lateral explosion of priming.

I claim—

1. The placing of the hammer and trigger with their springs within the arm D.
2. The cocking of the hammer by the movement of the arm D and the aid of the stud S or its equivalent.
3. The placing of the tape-priming under the barrel and in front of the cone, the same to be brought properly onto the cone by the movement of the arm D.
4. The placing of the tape-priming and operating the same, as described, in combination with the arm D.

The whole substantially as described in the within specification.

F. D. NEWBURY.

Witnesses:
RICHD. VARICK DE WITT,
W. C. MILLER.